United States Patent
Onodera

(10) Patent No.: US 11,242,439 B2
(45) Date of Patent: Feb. 8, 2022

(54) FOAM DUCT

(71) Applicant: KYORAKU CO., LTD., Kyoto (JP)

(72) Inventor: Masaaki Onodera, Nagoya (JP)

(73) Assignee: KYORAKU CO., LTD., Kyoto (JP)

(*) Notice: Subject to any disclaimer, the term of this patent is extended or adjusted under 35 U.S.C. 154(b) by 134 days.

(21) Appl. No.: 16/607,511

(22) PCT Filed: Apr. 26, 2018

(86) PCT No.: PCT/JP2018/016951
§ 371 (c)(1),
(2) Date: Oct. 23, 2019

(87) PCT Pub. No.: WO2018/199221
PCT Pub. Date: Nov. 1, 2018

(65) Prior Publication Data
US 2020/0071479 A1 Mar. 5, 2020

(30) Foreign Application Priority Data

Apr. 27, 2017 (JP) .............................. JP2017-088452

(51) Int. Cl.
*C08J 9/00* (2006.01)
*B29C 49/00* (2006.01)
*B29L 31/30* (2006.01)

(52) U.S. Cl.
CPC .......... *C08J 9/0061* (2013.01); *B29C 49/0005* (2013.01); *B29L 2031/3008* (2013.01); *C08J 2205/044* (2013.01); *C08J 2323/06* (2013.01); *C08J 2323/12* (2013.01)

(58) Field of Classification Search
CPC ..................................................... C08J 9/0061
See application file for complete search history.

(56) References Cited

U.S. PATENT DOCUMENTS

| | | | |
|---|---|---|---|
| 2009/0263645 A1 | 10/2009 | Barger et al. | |
| 2010/0279087 A1* | 11/2010 | Tokiwa | B29C 49/0005 428/212 |
| 2011/0048571 A1* | 3/2011 | Onodera | B60H 1/00564 138/177 |
| 2011/0104414 A1* | 5/2011 | Onodera | C08J 9/06 428/36.5 |
| 2013/0032963 A1 | 2/2013 | Tokiwa et al. | |
| 2015/0045468 A1* | 2/2015 | Onodera | C08L 23/0815 521/134 |
| 2016/0304693 A1 | 10/2016 | Itoi | |
| 2016/0333159 A1* | 11/2016 | Onodera | C08J 9/0061 |
| 2017/0015872 A1 | 1/2017 | Iwasaki et al. | |
| 2018/0215885 A1 | 8/2018 | Someya et al. | |

FOREIGN PATENT DOCUMENTS

| | | |
|---|---|---|
| JP | 2002-047369 A | 2/2002 |
| JP | 2007-160582 A | 6/2007 |
| JP | 2010-167628 A | 8/2010 |
| JP | 2011-201085 A | 10/2011 |
| JP | 2015-124380 A | 7/2015 |
| JP | 2015-187263 A | 10/2015 |
| JP | 2017-039812 A | 2/2017 |

OTHER PUBLICATIONS

Extended European Search Report dated Feb. 25, 2020 in corresponding European Application No. 18792083.0; 7 pgs.
International Search Report dated Jul. 31, 2018 of corresponding International Application No. PCT/JP2018/016951; 2 pgs.

* cited by examiner

*Primary Examiner* — Irina Krylova
(74) *Attorney, Agent, or Firm* — Maier & Maier, PLLC

(57) ABSTRACT

A foam duct has a superior cushioning property. The foam duct includes a tube portion; while the tube portion has a cell deformation ratio in a circumferential direction of 0.3 or lower, and a cell anisotropy of 0.6 to 1.6.

1 Claim, 6 Drawing Sheets

FOAM DUCT

TECHNICAL FIELD

The present invention relates to a foam duct.

BACKGROUND

Dashboard of an automobile is provided with a duct (referred to as "instrument panel duct") for allowing air ventilation from air conditioner. Considering thermal insulation and sound insulation, a foam duct structured with a foam molded body is used for the duct (Patent Literature 1). The foam duct is formed by foam blow molding and the like.

CITATION LIST

Patent Literature

[Patent Literature 1] JP 2015-124380A

SUMMARY OF THE INVENTION

Technical Problem

When an automobile comes into a frontal collision with a pedestrian, the head of the pedestrian may collide with the dashboard due to the collision impact. It is preferable that the foam duct has cushioning property to relieve shock applied to the head.

The present invention has been made by taking the afore-mentioned circumstances into consideration. The present invention provides a foam duct with superior cushioning property.

Solution to Problem

According to the present invention, provided is a foam duct comprising a tube portion; wherein: the tube portion has a cell deformation ratio in a circumferential direction of 0.3 or lower, and a cell anisotropy of 0.6 to 1.6.

The present inventors have conducted intensive investigation, and have found that when a cell deformation ratio in the circumferential direction and a cell anisotropy of the foam duct is controlled within a particular range, the cushioning property can be improved, thereby leading to completion of the present invention.

Hereinafter, various embodiments of the present invention will be described. The embodiments described hereinafter can be combined with each other.

Preferably, the tube portion has an expansion ratio of 1.5 to 3.5 times.

Preferably, the tube portion has an average thickness of 1.0 to 2.0 mm.

Preferably, the tube portion has a blow ratio 0.3 to 1.0.

Preferably, the tube portion an average cell diameter in a thickness direction of 100 μm or less.

Preferably, a resin structuring the tube portion comprises HDPE and LDPE, and a mass ratio of the HDPE and the LDPE is 35:65 to 70:30.

MODE FOR CARRYING OUT THE INVENTION

Figure 1:
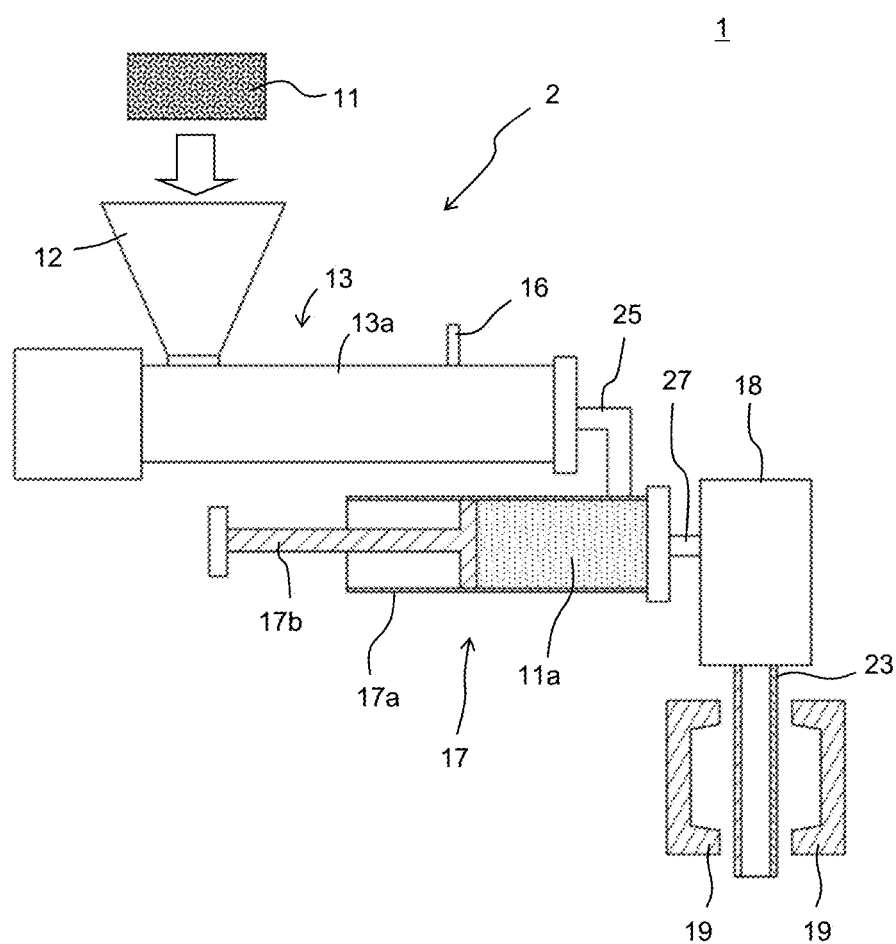
FIG. 1 shows one example of a molding machine 1 which can be used for manufacturing the foam duct according to one embodiment of the present invention.

Hereinafter, various embodiments of the present invention will be described. Various distinctive features shown in the following embodiments can be combined with each other. In addition, an invention can be established independently for each of the distinctive features.

1. Constitution of Molding Machine 1

First, the molding machine 1 which can be used for manufacturing the foam duct according to one embodiment of the present invention will be explained with reference to FIG. 1. The molding machine 1 comprises a resin feeder 2, a head 18, and split dies 19. The resin feeder 2 comprises a hopper 12, an extruder 13, an injector 16, and an accumulator 17. The extruder 13 and the accumulator 17 are connected via a connecting tube 25. The accumulator 17 and the head 18 are connected via a connecting tube 27.

Hereinafter, each of the constituents will be explained in detail.

<Hopper 12, Extruder 13>

The hopper 12 is used for charging raw resin 11 into the cylinder 13a of the extruder 13. The form of the raw resin 11 is not particularly limited, and is usually a pellet form. The raw resin 11 is a thermoplastic resin such as polyolefin. As the polyolefin, low density polyethylene (LDPE), linear low density polyethylene, high density polyethylene (HDPE), polypropylene, ethylene-propylene copolymer, and mixtures thereof can be mentioned for example. The raw resin 11 preferably contains HDPE and LDPE, and the mass ratio of HDPE and LDPE is preferably in the range of 35:65 to 70:30. The raw resin 11 is charged into the cylinder 13a from the hopper 12, and is then heated in the cylinder 13a, thereby melting the raw resin 11 to give a molten resin. In addition, the screw provided in the cylinder 13a rotates to convey the molten resin towards the tip of the cylinder 13a. The screw is provided in the cylinder 13a, and the rotation of the screw conveys and kneads the molten resin. A gear device is provided at the rear anchor of the screw, and the rear anchor rotates the screw. The number of screws provided in the cylinder 13a can be one, or more than one.

<Injector 16>

To the cylinder 13a, an injector 16 to inject a foaming agent is provided. As the foaming agent injected from the injector 16, a physical foaming agent, a chemical foaming agent, and mixtures thereof can be mentioned. Here, the physical foaming agent is preferable. As the physical foaming agent, inorganic physical foaming agent such as air, carbon dioxide gas, nitrogen gas, water and the like; organic physical foaming agent such as butane, pentane, hexane, dichloromethane, dichloroethane and the like; and supercritical fluid thereof can be used. The supercritical fluid is preferably made by using carbon dioxide, nitrogen and the like. When nitrogen is used, supercritical fluid is obtained under critical temperature of −149.1° C. and critical pressure of 3.4 MPa or higher, and when carbon dioxide is used, supercritical fluid is obtained under critical temperature of 31° C. and critical pressure of 7.4 MPa or higher. As the chemical foaming agent, ones which can generate carbon dioxide gas by chemical reaction, such as acid (citric acid or salt thereof for example) and base (sodium bicarbonate for example) can be mentioned. The chemical foaming agent can be charged from the hopper 12 instead of being injected from the injector 16.

<Accumulator 17, Head 18>

The molten resin 11a obtained by melting and kneading the raw resin and the foaming agent is extruded from a resin extrusion port of the cylinder 13a, and is injected into the accumulator 17 via the connecting tube 25. The accumulator 17 is provided with a cylinder 17a and a piston 17b capable of sliding within the cylinder 17a. The molten resin 11a can be retained in the cylinder 17a. The piston 17b is moved after a predetermined amount of the molten resin 11a is retained in the cylinder 17a, thereby extruding the molten resin 11a from the die slit provided in the head 18 via the connecting tube 27. Accordingly, the molten resin 11a dangles and forms a foaming parison 23. The form of the foaming parison 23 is not particularly limited, and can be a tubular form or a sheet form.

<Split Die 19>

Figure 2:
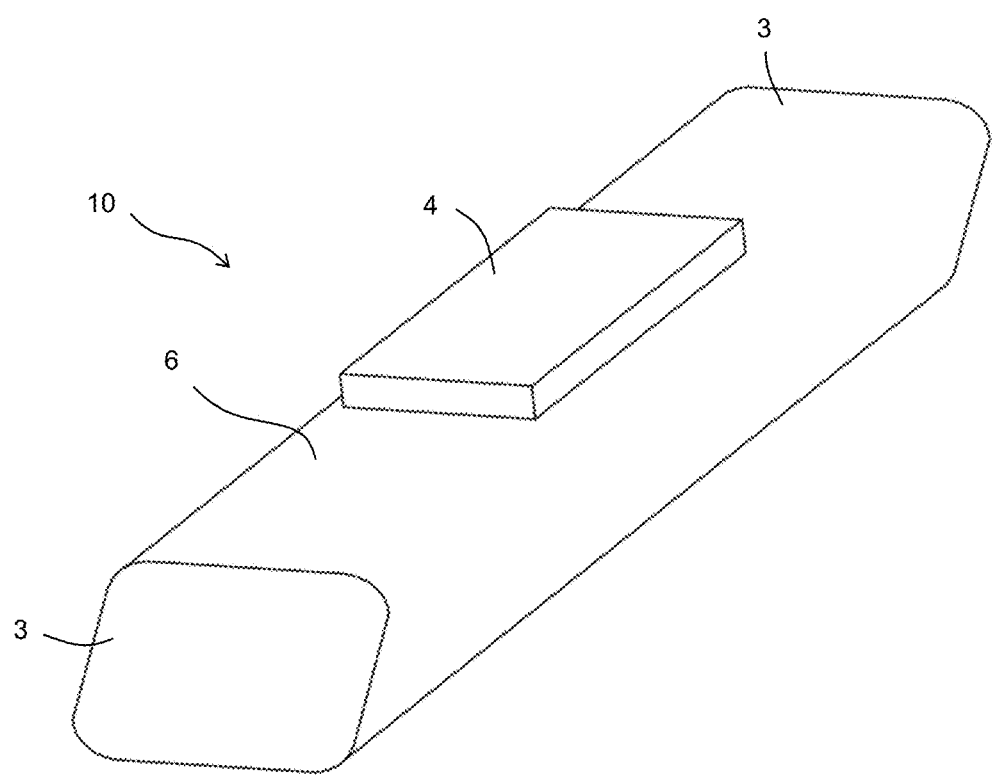
FIG. 2 is a perspective view showing the foam molded body 10 for manufacturing the foam duct 7.

The foaming parison 23 is introduced in between a pair of split dies 19. The foaming parison 23 is subjected to molding by using the split dies 19, thereby obtaining the foam molded body 10 as shown in FIG. 2. Method of molding using the split dies 19 is not particularly limited, and can be a blow molding which performs molding by introducing air into the cavity of the split dies 19, and can be a vacuum molding which performs molding of the foaming parison 23 by decompressing inside the cavity from the inner surface of the cavity of the split dies 19, or a combination thereof.

FIG. 2 shows a foam molded body 10 for manufacturing the foam duct. The foam molded body 10 includes bag portions 3 and 4. The bag portion 4 is provided so as to stand up from a tube portion 6. The bag portion 3 is provided on both ends of the tube portion 6. In FIG. 2, the foam molded body 10 does not have a branched structure. However, the bag portion 3 can be branched so that the number of the bag portion 3 is 3, 4, or more than 4.

2. Foam Duct

Figure 3:
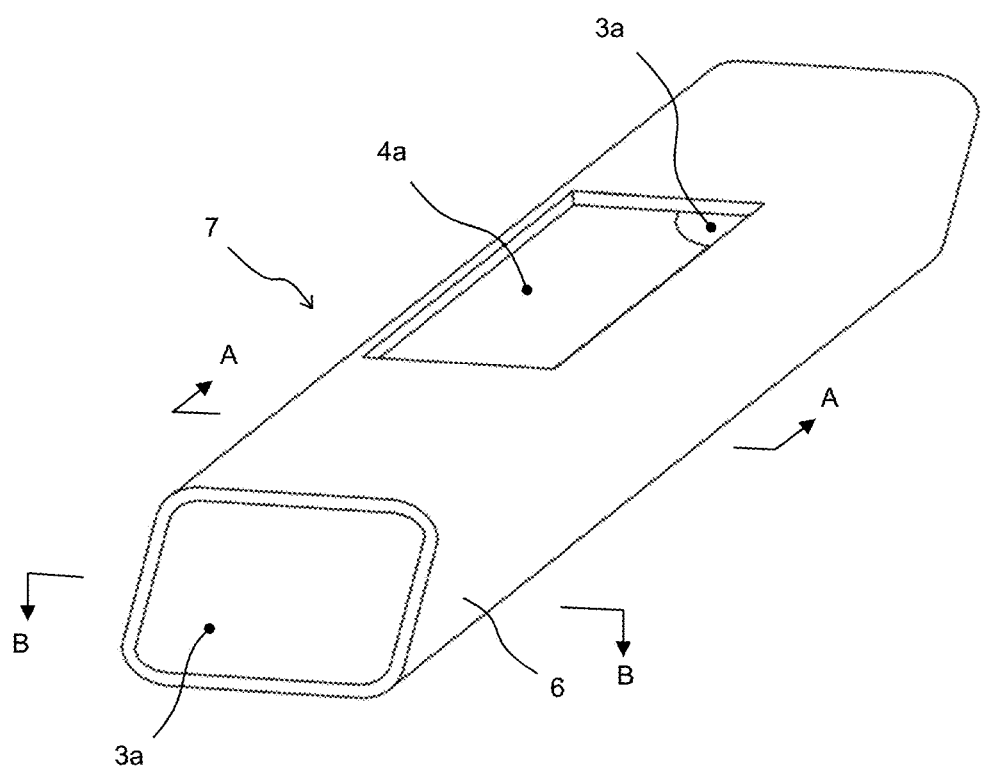
FIG. 3 is a perspective view of the foam duct 7.

The foam duct 7 can be formed by cutting off the bag portions 3 and 4 from the foam molded body 10. As shown in FIG. 3, opening portions 3a and 4a are formed at the position of the bag portions 3 and 4, respectively. That is, the foam duct 7 has a form in which opening portions 3a and 4a are provided to the tube portion 6. The air from the air conditioner flows into the foam duct 7 via the opening portion 4a, and is discharged via the opening portions 3a. In the present embodiment, the foam duct 7 is an instrument panel duct arranged inside the dashboard, however, the foam duct 7 can be a duct arranged in a different position. In addition, the foam duct 7 can be a duct which serves so as to discharge air introduced from one of the opening portion 3a via another opening portion 3a. The foam duct 7 (tube portion 6) has a closed cell structure. The closed cell structure is a structure including a plurality of closed bubble cells, and the ratio of the closed cell is 70% or higher.

Figure 4:
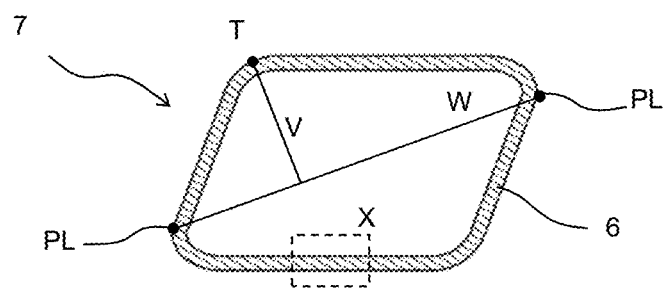
FIG. 4 is a cross-sectional view in the cross wise direction (taken along the line A-A of FIG. 3) of the foam duct 7.
Figure 5A:
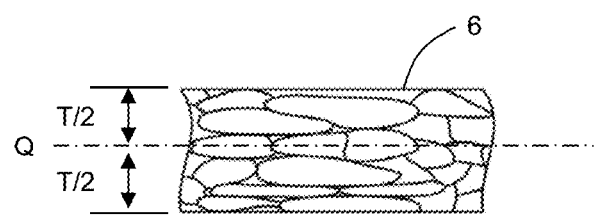
FIG. 5A is an enlarged view showing region X in FIG. 4, which is in a condition where the wall surface is structured with a plurality of cells.
Figure 5B:
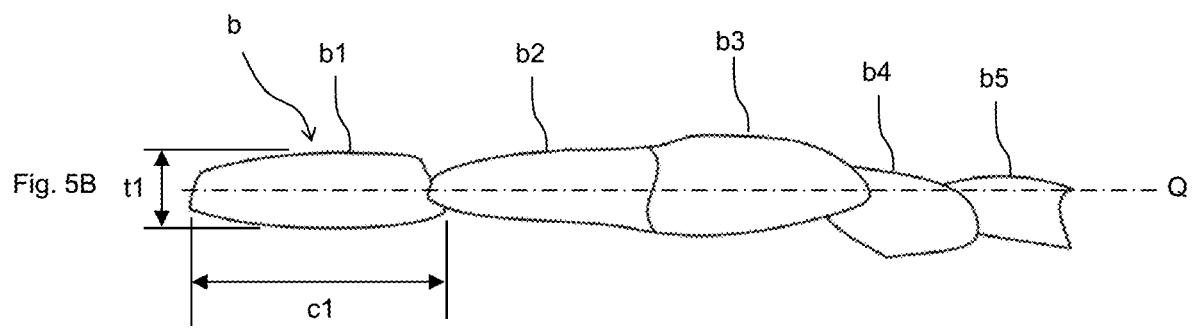
FIG. 5B is an enlarged view showing five cells b that fall on the thickness bisector Q in FIG. 5A.

The tube portion 6 has a cell deformation ratio in the circumferential direction of 0.30 or lower. The cell deformation ratio in the circumferential direction is defined, as shown in FIGS. 4, 5A, and 5B, with a cell b which falls on the thickness bisector Q in the cross section in the cross wise direction of the tube portion 6, as (average cell diameter in the thickness direction t/average cell diameter in the circumferential direction c). The average cell diameter in the thickness direction t and the average cell diameter in the circumferential direction c are each average value of the cell diameter in the thickness direction t and of the cell diameter in the circumferential direction c, obtained from five cells which fall on the thickness bisector Q. The cell diameter in the thickness direction t1 and the cell diameter in the circumferential direction c1 of the cell b1 can be measured as shown in FIG. 5B. The cell diameters in the thickness direction t2 to t5 and the cell diameters in the circumferential direction c2 to c5 of the cells b2 to b5 can be measured in a similar manner. The average cell diameter in the thickness direction t can be calculated as an arithmetical mean of t1 to t5, and average cell diameter in the circumferential direction c can be calculated as an arithmetical mean of c1 to c5. The cell deformation ratio in the circumferential direction is, for example, 0.05 to 0.30, and is specifically for example, 0.05, 0.10, 0.15, 0.20, 0.25, or 0.30, and can be in the range between the two values exemplified herein.

Figure 6:
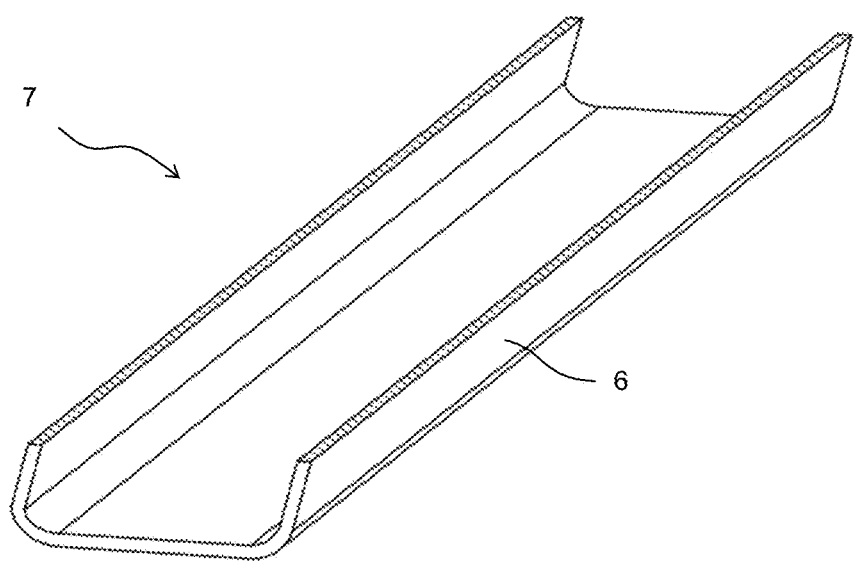
FIG. 6 is a cross-sectional view in the longitudinal direction (taken along the line B-B of FIG. 3) of the foam duct 7.

The tube portion 6 preferably has a cell deformation ratio in the longitudinal direction of 0.30 or lower. The cell deformation ratio in the longitudinal direction is defined, as shown in FIG. 6, with a cell b which falls on the thickness bisector Q in the cross section in the longitudinal direction of the tube portion 6, as (average cell diameter in the thickness direction t/average cell diameter in the longitudinal direction l). The average cell diameter in the longitudinal direction l can be obtained by measuring cell diameters l1 to l5 of five cells which fall on the thickness bisector Q, and then calculating an arithmetical mean of l1 to l5. The cell deformation ratio in the longitudinal direction is, for example, 0.05 to 0.30, and is specifically for example, 0.05, 0.10, 0.15, 0.20, 0.25, or 0.30, and can be in the range between the two values exemplified herein.

The cell anisotropy of the tube portion 6 is 0.6 to 1.6. The cell anisotropy is defined as (cell deformation ratio in the longitudinal direction)/(cell deformation ratio in the circumferential direction). The cell anisotropy can be calculated also by (average cell diameter in the circumferential direction c)/(average cell diameter in the longitudinal direction l). The cell anisotropy is specifically for example, 0.6, 0.7, 0.8, 0.9, 1.0, 1.1, 1.2, 1.3, 1.4, 1.5, or 1.6, and can be in the range between the two values exemplified herein.

The average cell diameter in the thickness direction t is preferably 100 μm or less, and is preferably 50 to 100 μm, and is specifically for example, 50, 55, 60, 65, 70, 75, 80, 85, 90, 95, or 100 μm, and can be in the range between the two values exemplified herein. The average cell diameter in the circumferential direction c is preferably 200 to 600 μm, and is preferably 250 to 550 μm, and is specifically for example, 200, 250, 300, 350, 400, 450, 500, 550, or 600 μm, and can be in the range between the two values exemplified herein. The average cell diameter in the longitudinal direction l is preferably 200 to 600 μm, and is preferably 250 to 550 μm, and is specifically for example, 200, 250, 300, 350, 400, 450, 500, 550, or 600 μm, and can be in the range between the two values exemplified herein.

The expansion ratio of the tube portion 6 is preferably 1.5 to 3.5 times, and is specifically for example, 1.5, 2, 2.5, 3 or 3.5 times, and can be in the range between the two values exemplified herein.

The average thickness of the tube portion 6 is preferably 1.0 to 2.0 mm, and is specifically for example, 1.0, 1.1, 1.2, 1.3, 1.4, 1.5, 1.6, 1.7, 1.8, 1.9, or 2.0 mm, and can be in the range between the two values exemplified herein.

The blow ratio of the tube portion 6 is preferably 0.3 to 1.0, and is specifically for example, 0.3, 0.4, 0.5, 0.6, 0.7, 0.8, 0.9, or 1.0, and can be in the range between the two values exemplified herein. The blow ratio is calculated as follows. First, as shown in FIG. 4, in the cross sectional plane in the cross wise direction of the tube portion 6, the outermost points facing each other on the parting line PL are connected with a linear line W. Then, within the cross sectional plane in the cross wise direction, a point T which is mostly apart from the linear line W is connected with the linear line W by a linear line V. Subsequently, the blow ratio is calculated by the formula of "blow ratio=(length of linear line V)/(length of linear line W)".

The resin structuring the tube portion 6 comprises HDPE and LDPE. The resin structuring the tube portion 6 can comprise a resin other than the HDPE and the LDPE. The mass ratio of HDPE and LDPE with respect to the total resin structuring the tube portion 6 is preferably 0.8 or higher, more preferably 0.9 or higher, and even more preferably 1. The mass ratio of HDPE and LDPE is preferably 35:65 to 70:30, and more preferably 40:60 to 60:40.

Examples

Examples and Comparative Examples of the foam molded body 10 shown in Table 1 were prepared by using the molding machine shown in FIG. 1. The inner diameter of the cylinder 13a of the extruder 13 was 50 mm, and L/D was 34. As the raw resin, LDPE (grade: G201-F, melt flow rate: 2 g/10 min at 190° C. under a load of 2.16 kg, density: 919 kg/m$^3$, available from SUMITOMO CHEMICAL Co., Ltd.) and HDPE (grade: B470, melt flow rate: 0.3 g/10 min at 190° C. under a load of 2.16 kg, density: 949 kg/m$^3$, available from Asahi Kasei Corp.) were blended by mass ratio of 1:1, and then 1.0 parts by weight of LDPE base master batch including 20 wt % of sodium hydrogen carbonate based foaming agent (product name "Finecell Master P0217K", available from Dainichiseika Color & Chemicals Mfg. Co., Ltd.) as a nucleating agent and 1.0 parts by weight of LLDPE base master batch including 40 wt % of carbon black as a colorant were added to 100 parts by mass of the resin, and used. Temperature of each of the portions were controlled so that the temperature of the foaming parison 23 would be in the range of 190 to 200° C. As the foaming agent, N2 gas was used, and was injected via the injector 16. Injection amount of the foaming agent, extrusion speed of the molten resin 11a, and the gap between the die slits of the head 18 were arranged so that the expansion ratio, average thickness, and the average cell diameter would satisfy the values shown in Table 1.

The foaming parison 23 as formed with the afore-mentioned conditions was placed in between the split dies 19, and blow molding was performed to prepare the foam molded body shown in FIG. 2. The split dies 19 were selected so that the blow ratio satisfies the value shown in Table 1.

From the foam molded body 10, a test piece A of which length in the circumferential direction is long (25 mm×50 mm), and a test piece B of which length in the longitudinal direction (flowing direction of the foaming parison) (25 mm×50 mm) were cut out. The cross section in the cross wise direction which shows up in the test piece A was photographed with a magnification of 50 times. Cell diameter in the thickness direction and the cell diameter in the circumferential direction were measured for each of the five cells which fall on the thickness bisector Q, and then the average cell diameter in the thickness direction and the average cell diameter in the circumferential direction were calculated as the arithmetical mean. Further, the cross section in the longitudinal direction which shows up in the test piece B was photographed with a magnification of 50 times. Cell diameter in the thickness direction and the cell diameter in the circumferential direction were measured for each of the five cells which fall on the thickness bisector Q, and then the average cell diameter in the thickness direction and the average cell diameter in the circumferential direction were calculated as the arithmetical mean. The values thus obtained are shown in Table 1. As the average cell diameter in the thickness direction, arithmetical mean of the value obtained with the cross section in the cross wise direction and the value obtained with the cross section in the longitudinal direction are shown in Table 1.

<Bending Test>

The maximum bending strength in the circumferential direction was measured using the test piece A in the three-point bending test. The maximum bending strength in the longitudinal direction was measured using the test piece B in the three-point bending test. When the maximum bending strength falls in the range of 1.0 to 4.5N, the Example was evaluated as "A", and when the maximum bending strength was out of this range, the Example was evaluated as "B". The temperature was set to ambient temperature, the distance between the supporting points was 30 mm, and the bending speed was 2.0 mm/min. The results obtained are shown in Table 1.

<Cushioning Property>

When the results for the bending test in the circumferential direction and in the longitudinal direction were both "A", the cushioning property was evaluated as "A", and when at least either one of the results for the bending tests was "B", the cushioning property was evaluated as "B".

<Discussion>

As shown in Table 1, all of the Examples which have a cell deformation ratio in the circumferential direction of 0.30 or lower and a cell anisotropy of 0.6 to 1.6 showed superior cushioning property. On the other hand, all of the Comparative Examples which have a cell deformation ratio in the circumferential direction exceeding 0.30 or the cell anisotropy being out of the range of 0.6 to 1.6 had excess bending strength in either one of or both of the bending strength in the circumferential direction and the longitudinal direction. Accordingly, the Comparative Examples were reluctant to bending deformation in an occasion of collision, and had poor cushioning property.

TABLE 1

| | | expansion ratio (times) | average thickness (mm) | blow ratio | average cell diameter (μm) | | |
| --- | --- | --- | --- | --- | --- | --- | --- |
| | | | | | thickness direction | circumferential direction | longitudinal direction |
| Example | 1 | 1.5 | 1.0 | 0.32 | 84 | 342 | 295 |
| | 2 | 1.65 | 1.1 | 0.32 | 76 | 499 | 375 |

TABLE 1-continued

| | | | | | | | |
|---|---|---|---|---|---|---|---|
| | | 3 | 1.5 | 1.5 | 0.32 | 76 | 363 | 534 |
| | | 4 | 2.5 | 1.6 | 0.32 | 64 | 450 | 287 |
| | | 5 | 3.5 | 1.8 | 0.32 | 60 | 294 | 327 |
| | | 6 | 3.0 | 1.9 | 0.32 | 65 | 289 | 241 |
| | | 7 | 3.5 | 2.0 | 0.32 | 80 | 280 | 267 |
| Comparative | 1 | 1.5 | 1.0 | 0.11 | 124 | 289 | 204 |
| Example | 2 | 1.65 | 1.1 | 0.11 | 141 | 342 | 222 |
| | 3 | 1.5 | 1.5 | 0.11 | 103 | 240 | 188 |
| | 4 | 2.5 | 1.6 | 0.11 | 113 | 257 | 166 |
| | 5 | 3.5 | 1.8 | 0.11 | 105 | 269 | 213 |
| | 6 | 3.0 | 1.9 | 0.11 | 113 | 230 | 174 |
| | 7 | 3.5 | 2.0 | 0.11 | 149 | 269 | 212 |
| | 8 | 1.5 | 1.5 | 0.32 | 64 | 233 | 476 |
| | 9 | 1.5 | 1.5 | 0.32 | 68 | 545 | 306 |

| | | cell deformation ratio in circumferential direction | cell deformation ratio in longitudinal direction | cell anisotropy | bending test circumferential direction | bending test longitudinal direction | cushioning property |
|---|---|---|---|---|---|---|---|
| Example | 1 | 0.25 | 0.28 | 1.16 | A | A | A |
| | 2 | 0.15 | 0.20 | 1.33 | A | A | A |
| | 3 | 0.21 | 0.14 | 0.68 | A | A | A |
| | 4 | 0.14 | 0.22 | 1.57 | A | A | A |
| | 5 | 0.20 | 0.18 | 0.90 | A | A | A |
| | 6 | 0.22 | 0.27 | 1.20 | A | A | A |
| | 7 | 0.29 | 0.30 | 1.05 | A | A | A |
| Comparative | 1 | 0.43 | 0.61 | 1.42 | B | B | B |
| Example | 2 | 0.41 | 0.64 | 1.54 | B | B | B |
| | 3 | 0.43 | 0.55 | 1.28 | B | B | B |
| | 4 | 0.44 | 0.68 | 1.55 | B | B | B |
| | 5 | 0.39 | 0.49 | 1.26 | B | B | B |
| | 6 | 0.49 | 0.65 | 1.32 | B | B | B |
| | 7 | 0.55 | 0.70 | 1.27 | B | B | B |
| | 8 | 0.27 | 0.13 | 0.49 | A | B | B |
| | 9 | 0.12 | 0.22 | 1.78 | B | A | B |

EXPLANATION OF SYMBOLS

1: molding machine
2: resin feeder
3: bag portion
3a: opening portion
4: bag portion
4a: opening portion
6: tube portion
7: foam duct
10: foam molded body
11: raw resin
11a: molten resin
12: hopper
13: extruder
13a: cylinder
16: injector
17: accumulator
17a: cylinder
17b: piston
18: head
19: split die
23: foaming parison
25: connecting tube
27: connecting tube

The invention claimed is:

1. A foam duct comprising a tube portion; wherein:
a resin structuring the tube portion comprises high-density polyethylene (HDPE) and low-density polyethylene (LDPE), and a mass ratio of the HDPE and the LDPE is 1 to 1,
the HDPE has a melt flow rate of 0.3 g/10 min at 190° C. under a load of 2.16 kg and a density of 949 kg/m³,
the LDPE has a melt flow rate of 2 g/10 min at 190° C. under a load of 2.16 kg and a density of 919 kg/m³,
the tube portion has an expansion ratio of 1.5 to 3.5 times,
the tube portion has an average thickness of 1.0 to 2.0 mm,
the tube portion has a blow ratio of 0.32,
the tube portion has a cell deformation ratio in a circumferential direction of 0.14 to 0.29, a cell deformation ratio in a longitudinal direction of 0.14 to 0.30, and a cell anisotropy of 0.68 to 1.57,
the tube portion has an average cell diameter in a thickness direction of 60 to 84 μm, an average cell diameter in the circumferential direction of 280 to 499 μm, and an average cell diameter in the longitudinal direction of 241 to 534 μm, and
maximum bending strength in the circumferential direction and maximum bending strength in the longitudinal direction are each 1.0 to 4.5 N.

* * * * *